(12) United States Patent
Krishnamurthy

(10) Patent No.: US 10,802,741 B2
(45) Date of Patent: Oct. 13, 2020

(54) PRE-ZEROING BLOCKS IN FILES USING AUTOMATIC FILE UNMAP FRAMEWORK

(71) Applicant: VMWARE, INC., Palo Alto, CA (US)

(72) Inventor: Pradeep Krishnamurthy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/273,179

(22) Filed: Feb. 12, 2019

(65) Prior Publication Data

US 2020/0150865 A1 May 14, 2020

(30) Foreign Application Priority Data

Nov. 21, 2018 (IN) .............................. 201841043818

(51) Int. Cl.
| | | |
|---|---|---|
| *G06F 3/06* | (2006.01) | |
| *G06F 12/02* | (2006.01) | |
| *G06F 16/17* | (2019.01) | |
| *G06F 16/176* | (2019.01) | |
| *G06F 9/455* | (2018.01) | |

(52) U.S. Cl.
CPC ............ *G06F 3/064* (2013.01); *G06F 3/0608* (2013.01); *G06F 3/0619* (2013.01); *G06F 3/0631* (2013.01); *G06F 3/0643* (2013.01); *G06F 3/0652* (2013.01); *G06F 3/0662* (2013.01); *G06F 3/0683* (2013.01); *G06F 9/45558* (2013.01); *G06F 12/0246* (2013.01); *G06F 16/1727* (2019.01); *G06F 16/1774* (2019.01); *G06F 2009/45579* (2013.01); *G06F 2009/45583* (2013.01)

(58) Field of Classification Search
CPC .... G06F 3/064; G06F 9/45558; G06F 3/0683; G06F 3/0662; G06F 16/1774; G06F 3/0619; G06F 12/0246; G06F 3/0652; G06F 3/0643; G06F 16/1727; G06F 3/0631; G06F 3/0608; G06F 2009/45579; G06F 2009/45583
See application file for complete search history.

(56) References Cited

U.S. PATENT DOCUMENTS

| | | | |
|---|---|---|---|
| 6,745,305 | B2 | 6/2004 | McDowell |
| 6,851,005 | B1 * | 2/2005 | Gnanasivam ......... G06F 3/0622 710/107 |
| 7,139,863 | B1 * | 11/2006 | Defouw ............. G06F 12/0246 711/103 |
| 7,293,154 | B1 | 11/2007 | Karr et al. |
| 9,436,595 | B1 * | 9/2016 | Benitez ............... G06F 12/0246 |
| 2008/0077590 | A1 * | 3/2008 | Pandit ................ G06F 11/1435 |
| 2008/0235479 | A1 | 9/2008 | Scales et al. |
| 2014/0195725 | A1 * | 7/2014 | Bennett .............. G06F 12/0246 711/103 |
| 2018/0267894 | A1 | 9/2018 | Jangam et al. |

* cited by examiner

*Primary Examiner* — Tasnima Matin
(74) *Attorney, Agent, or Firm* — Patterson + Sheridan, LLP

(57) ABSTRACT

The disclosure provides an approach for zeroing allocated storage blocks of a file. The blocks are zeroed in the background, during a normal operation of a storage system, thus lowering the chance that the latency of a storage operation would be increased by the zeroing process. The approach also precludes a delay in being able to use the file, the delay caused by pre-zeroing the storage blocks prior to use of the file.

20 Claims, 3 Drawing Sheets

PRE-ZEROING BLOCKS IN FILES USING AUTOMATIC FILE UNMAP FRAMEWORK

RELATED APPLICATIONS

Benefit is claimed under 35 U.S.C. 119(a)-(d) to Foreign Application Serial No. 201841043818 filed in India entitled "PRE-ZEROING BLOCKS IN FILES USING AUTOMATIC FILE UNMAP FRAMEWORK", on Nov. 21, 2018, by VMware, Inc., which is herein incorporated in its entirety by reference for all purposes.

BACKGROUND

When storage space, such as data blocks of a storage device, is allocated to a file, the data blocks of that allocated storage space should be zeroed. Zeroing data blocks deletes previously stored information on those blocks. Zeroing all data blocks allocated to a file can happen at different times, depending on implementation. For example, zeroing of all blocks can happen right away, when blocks are allocated to a file, before any input/output (I/O) operations (e.g., read/write) to the file are permitted. This can result in lag time before a file is accessible. Alternatively, zeroing of blocks can happen only if an I/O operation is requested on a block, and the zeroing occurs before the I/O operation is executed. This alternative approach to zeroing can increase latency of I/O operations, since many I/O operations would first wait for one or more storage blocks to be zeroed before the I/O operation is executed.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for zeroing allocated storage blocks of a file. The blocks are zeroed in the background, during a normal operation of a storage system, thus lowering the chance that the latency of a write storage operation would be increased by the zeroing process. The approach also precludes a delay in being able to use the file, the delay caused by pre-zeroing the storage blocks prior to use of the file. It should be noted, that in certain embodiments, the techniques disclosed herein are particularly advantageous for write operations rather than read operations. In these embodiments, pointer blocks (see FIG. 2) may have a flag indicating that a file data block that the pointer block points to needs to be zeroed, and the response to a read operation of an unzeroed file data block will be a zeroed buffer, which does not increase latency of a read operation.

Figure 1:
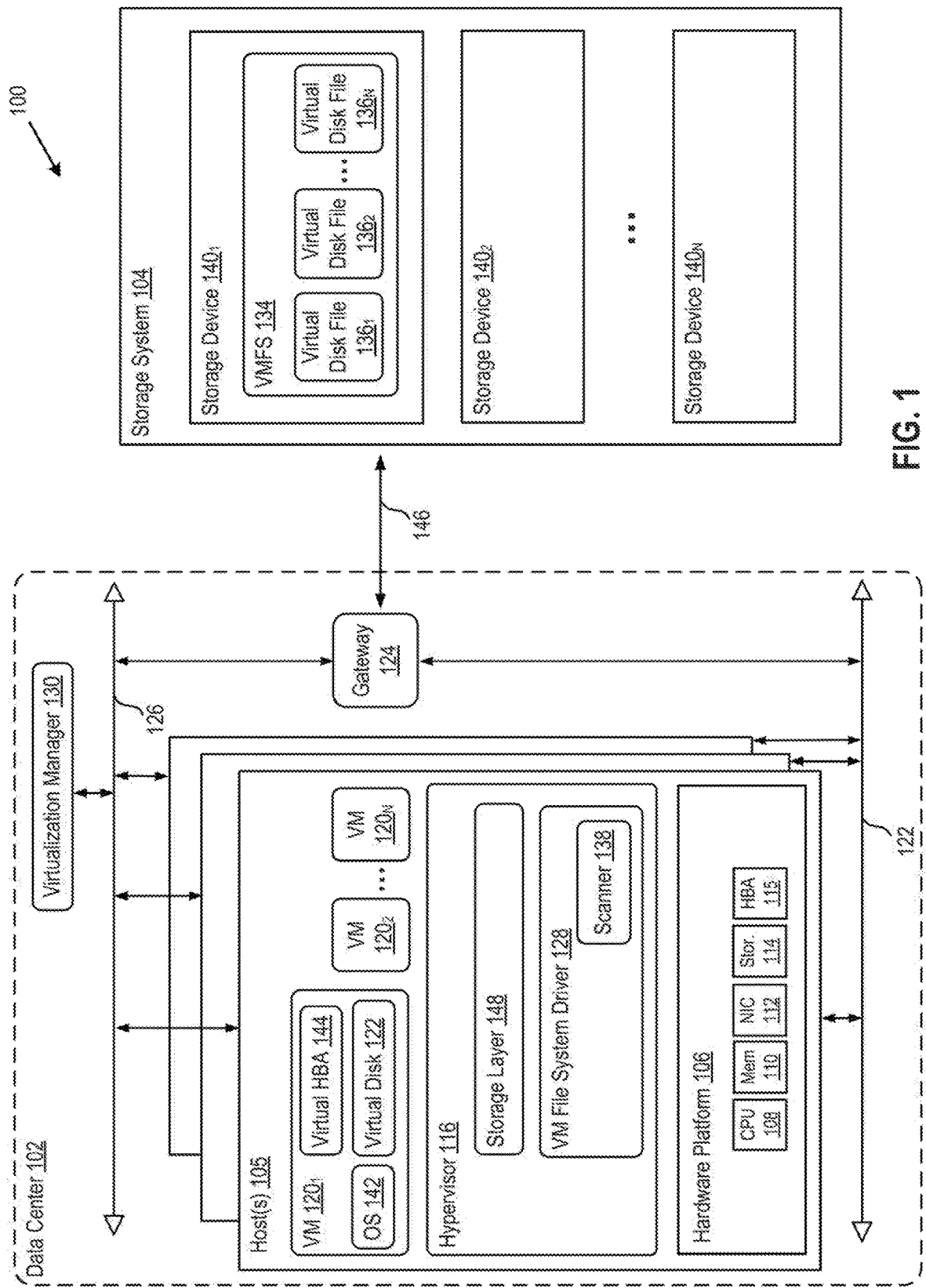
FIG. 1 depicts a block diagram of a virtualized desktop infrastructure system in which one or more embodiments of the present invention may be implemented.

FIG. 1 depicts a block diagram of a computing system 100 in which one or more embodiments of the present invention may be implemented. Computing system 100 comprises one or more data centers 102 connected to a storage system 104 over a network 146. Network 146 may be, for example, a direct link, a local area network (LAN), a wide area network (WAN) such as the Internet, a storage area network (SAN), another type of network, or a combination of these. Although storage system 104 is depicted as being located outside of data center 102 and accessible via gateway 124, storage system 104 may be located within data center 102 accessible without gateway 124. Storage system 104 may also be located within one of hosts 105 or distributed among several hosts 105.

Data center 102 includes host(s) 105, a virtualization manager 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 105 without the use of a hypervisor. One example of a hypervisor 116 that may be used is a VMware ESXi™ hypervisor provided as part of the VMware vSphere® solution made commercially available from VMware, Inc. of Palo Alto, Calif.

Hardware platform 106 of each host 105 includes components of a computing device such as one or more processors (CPUs) 108, system memory 110, a network interface 112, storage 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage 114 represents persistent storage devices (e.g., one or more hard disks, flash memory modules, solid state disks, and/or optical disks). Host bus adapter (HBA) couples host 105 to one or more external storage systems 104.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 124 provides VMs 120 and other components in data center 102 with connectivity to network 146. Gateway 124 may manage external public IP addresses for VMs 120, route traffic incoming to and outgoing from data center 102, and provide networking services, such as firewalls, network address translation (NAT), dynamic host configuration protocol (DHCP), and load balancing. Gateway 124 uses data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Storage system 104 comprises one or more storage devices 140. Storage device 140 is a persistent storage device, such as one or more hard disks, flash memory modules, solid state disks, and/or optical disks. Computer system 100 implements a virtual machine file system (VMFS) 134, shown within storage device 140. VMFS is implemented throughout computer system 100, on each storage device 140, and is controlled by instances of VMFS driver 128. An instance of VMFS driver 128 may be located within hypervisor 116 of each host 105.

Each VM 120 of host 105 includes a guest operating system 142, virtual host bus adapter (HBA) 144, and one or more virtual disks 122. Virtual disk 122 is associated with a virtual disk file 136 located on a storage device 140 of storage system 104. Virtual disk 122 exposes to VM 120 an abstraction of a physical storage disk. From the perspective of guest OS 142, calls to storage system 104 initiated by guest OS 142 appear to be routed to virtual disk 122 for final execution, but such calls are processed and passed through virtual HBA 144, to hypervisor 116, where the calls are translated into calls to virtual disk file 136 on storage system 104. HBA emulator of each hypervisor 116 enables the data transfer and control operations to be correctly handled by hypervisor 116, which ultimately passes such operations through its various layers to true hardware HBAs 115 or NIC 112 that connect to storage system 104. That is, virtual disk 122 is a logical abstraction of a storage disk, virtual disk 122 being implemented within VM 120. Virtual disk 122 is associated with a physical file (virtual disk file 136) present on storage system 104, and virtual disk file 136 stores actual data that is associated with virtual disk 122. Virtual disk 122 may be referred to as a "volume" or as an "app stack."

Hypervisor 116 includes a storage layer 148 configured to manage storage space persistently for VMs 120. In one embodiment, storage layer 148 may include numerous logical layers, such as an I/O virtualization layer, a file system driver, and a disk access layer. In some embodiments, the I/O virtualization layer of storage layer 148 receives a data transfer and control operation, in the form of I/O commands intended for virtual disk 122. The I/O virtualization layer converts the operations into file system operations that are understood by a virtual machine file system (VMFS) driver 128 in order to access virtual disk file 136 stored in underlying storage system 104 under the management of VMFS driver 128. The I/O virtualization layer issues these file system operations to VMFS driver 128.

VMFS driver 128 manages creation, use, and deletion of virtual disk files 136 (e.g., .vmdk files representing virtual disks) stored on physical locations (i.e., storage devices 140) of storage system 104, or stored in logical volumes or Logical Unit Numbers (LUNs) exposed by storage system 104. In an embodiment, an instance of VMFS driver 128 exists on each host 105. VMFS driver 128 manages VMFS 134, implements on computer system 100. VMFS driver 128 converts file system operations received from the I/O virtualization layer to raw small computer system interface (SCSI) operations, which are issued to a data access layer that applies command queuing and scheduling policies to the raw SCSI operations and ultimately sends the raw SCSI operations to components of physical hardware platform 106. While storage layer 148 is depicted as part of a virtualized architecture, storage layer 148 may be part of other software modules. For example, in an embodiment, storage layer 148 is a file system driver of an OS that manages storage space persistently for locally attached storage. VMFS driver 128 includes a scanner 138. Scanner 138 is discussed below, after discussion of FIG. 2.

Virtual disk file 136 stores actual data associated with virtual disk 122 of VM 120. The actual data stored may be in the form of files, such as virtual disk files 136 shown in FIG. 1. In an embodiment, virtual disk file 136 is a lazy zeroed thick (LZT) file. The "thick" of LZT means that virtual disk file 136 has allocated all data blocks upon creation. For example, if file virtual disk 136 is a 1 MB file, then upon creation, virtual disk file 136 is allocated 1 MB of data blocks from storage device 140. The "lazy zeroed" of LZT means that the data blocks allocated to virtual disk file 136 are not immediately zeroed upon allocation. The zeroing happens later, as discussed below with reference to FIG. 3. An exemplary data virtual disk file 136 is shown in FIG. 2.

Figure 2:
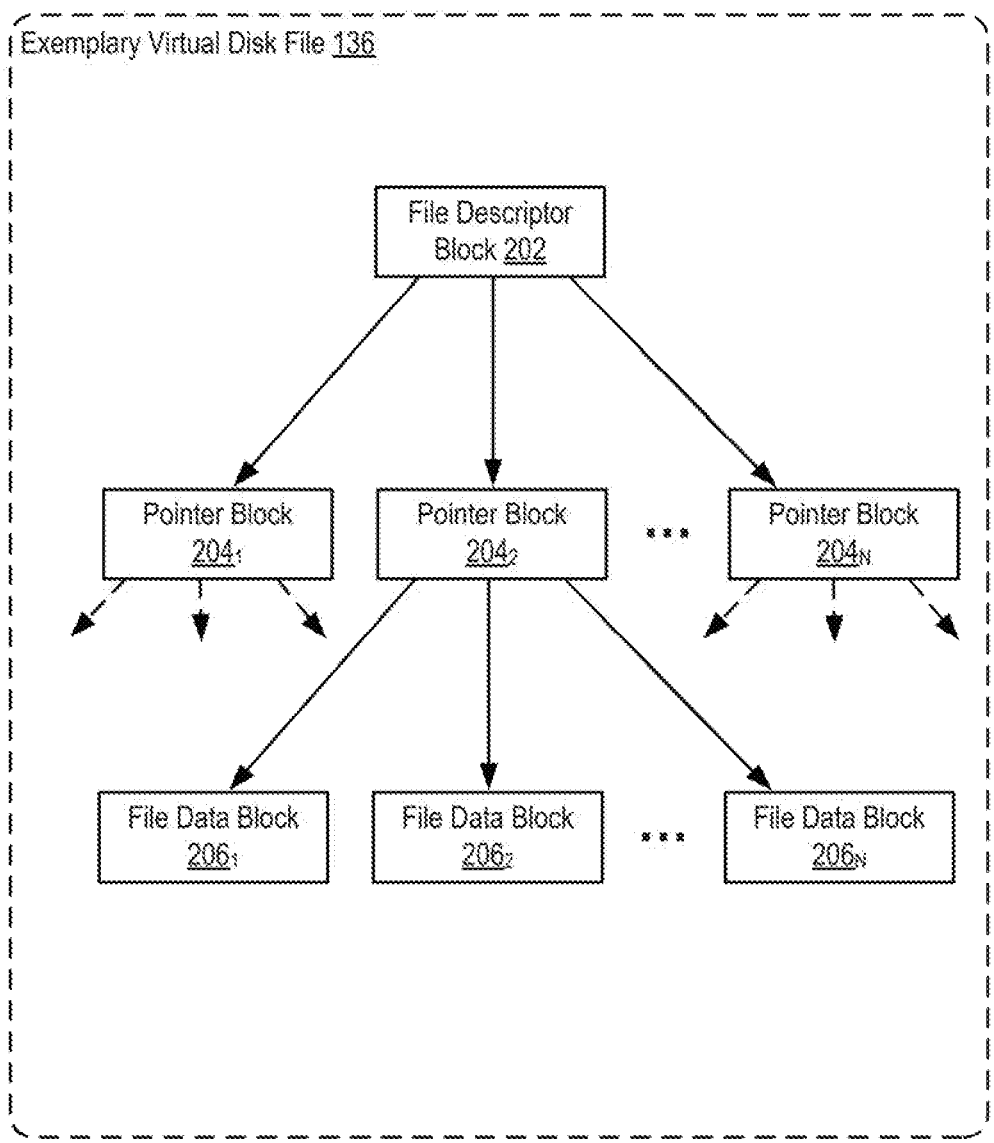
FIG. 2 depicts a block diagram of an exemplary virtual disk file, according to an embodiment.

FIG. 2 depicts a block diagram of an exemplary file, according to an embodiment.

Virtual disk file 136 comprises a file descriptor block 202, one or more pointer blocks 204, and one or more file data blocks 206. As used herein, a "file descriptor" may be an "inode" in some operating systems, or generally, may also be referred to as a "file handle." Inode or file descriptor block 202 is a block of storage system 104 or a data object located within a block of storage system 104. File descriptor block 202 is a root of virtual disk file 136. File descriptor block 202 stores metadata of virtual disk file 136. The metadata stored by file descriptor block 202 may include the size of a file and one or more addresses within storage system 104. The metadata stored by file descriptor block 202 may also include information such as file ownership, access mode (read, write, execute permissions for various users), file type, file size, and the like. The addresses within file descriptor block 202 function as pointers to pointer blocks 204. The addresses may be logical or physical addresses. A logical address is the address at which data appears to reside from the perspective of a guest OS within VM 120. A logical address may be different from the physical address due to the operation of an address translator or mapping function. Such mapping function may be, for example, maintained in pointer blocks 204, where file offsets are mapped to a volume address of storage device 140. It should be noted that the volume address itself may not be a physical address, but may be a logical address that is translated to a physical address of storage device 140 by components of storage system 104.

A pointer block 204 is a block of storage system 104 or a data object located within a block of storage system 104. Pointer block 204 contains one or more addresses within storage system 104. The addresses within pointer block 204 function as pointers to file data blocks 206. Although FIG. 2 shows pointer blocks 204 as pointing to file data blocks 206, virtual disk file 136 may contain several levels of pointers blocks 204, such that a pointer block 204 points to another pointer block 204, which points to a file data block 206 or to another pointer block 204. A block within storage system 104 (e.g., block containing file descriptor block 202, pointer block 204, or file data block 206) may be, for example, 4 KB, 16 KB, 1 MB, or 32 MB in size. In an embodiment, file descriptor block 202 is 4 KB, pointer block 204 is 64 KB, and file data block 206 is 1 MB but can range from 1 MB to 16 MB in size. Although only pointer block $204_2$ is shown in FIG. 2 as pointing to file data block 206, pointer blocks $204_1$ and $204_N$ are assumed to also be pointing to file data blocks 206, but those file data blocks 206 are not shown, for brevity.

As used herein, file data blocks 206 that are pointed to by a particular pointer block 204 are "downstream" of that pointer block 204. For example, assuming pointer block $204_2$ points to file data blocks $206_1$, $206_2$, and $206_N$, but not to file data blocks $206_3$ and $206_4$ (not shown), it can be said that file data blocks $206_1$, $206_2$, and $206_N$, are downstream of pointer block $204_1$, but not of pointer block $204_1$. It can also be said that file data blocks $206_3$ and $206_4$ are not downstream of pointer block $204_2$.

File data blocks 206 contain data of virtual disk file 136, while file descriptor 202 and pointer blocks 204 contain metadata of virtual disk file 136. As used herein, "data" of virtual disk file 136 is the data that an application or guest OS 142 may utilize directly. For example, an application request (e.g., read/write) for data may be formed (e.g., by the application) as an I/O command, which is converted to a file system operation (e.g., by an I/O layer implemented in the operating system) and sent to a file system driver within computing device 102. The file system driver may then issue commands (e.g., raw SCSI/SATA commands) to read/write to storage system 104 in data blocks 206.

As used herein, "metadata" of virtual disk file 136 is data that describes aspects of the data written, being written, or to be written to file data blocks 206 of storage system 104. As used herein, "data" of virtual disk file 136 includes information stored within file data block(s) 206 of virtual disk file 136, and does not typically include information stored within file descriptor block 202 of virtual disk file 136 and information stored within pointer block(s) 204 of virtual disk file 136. As used herein, "metadata" of virtual disk file 136 includes information that is stored or that will be stored within file descriptor block 202 of virtual disk file 136 and within pointer block(s) 204 of virtual disk file 136. In an embodiment, "metadata" does not typically include information stored within file data block(s) 206 of virtual disk file 136. For example, a file may be an ebook. The data of the ebook file may be the contents of the ebook. The metadata of the ebook file may include, for example, the file size, creation date, and storage location(s) within storage system 104 of the ebook file.

Each pointer block 204 also includes metadata that indicates whether file data blocks 206, to which that pointer block 204 points, have been zeroed and allocated. As used herein, to zero a storage block means to fill in zeroes in all data storage positions of the storage block. In an embodiment, the zeroing may be accomplished by sending the SCSI UNMAP command to storage system 104, indicating which file data block 206 to unmap, by sending zeroed buffers, or by sending a SCSI UNMAP/TRIM command.

For example, assume pointer block $204_2$ points to three file data blocks: $206_1$, $206_2$, and $206_N$. Pointer block $204_2$ then has a set of metadata "101," indicating whether file data blocks 206 have been zeroed. The "101" bits indicate that file data block $106_1$ has not been zeroed, as shown by the "1" in the first position of the "101". The "101" bits indicate that file data block $206_2$ has been zeroed, as shown by the "0" in the second position of the "101"). The "101" row also indicates that file data block $206_N$ has not been zeroed, as shown by the "1" in the third position of the "101." Metadata within pointer blocks 204 may be arranged in any suitable manner, such as in sets, groups, etc. The set of bits may be located throughout a pointer block 204, with a bit located, for example, inside a pointer address, the pointer address pointing to a file data block 206.

Returning to FIG. 1, scanner 138 of VMFS driver 128 assists in efficiently zeroing allocated file data blocks 206. Scanner 138 may be a software module. As described with reference to FIG. 3, scanner 138 scans pointer blocks 204 of a virtual disk file 136. Scanner 138 find metadata within each pointer block 204 indicating whether file data blocks 206 downstream of that pointer block 204 (i.e., pointed to by that pointer block 204) have been zeroed. Scanner 138 tracks which file data blocks have not yet been zeroed, and once scanner 138 locates a certain number of unzeroed file data blocks 206 within a given region of storage device 140, then scanner 138 locks that region from write requests (read requests will return zero). Scanner 138 zeroes all unzeroed file data blocks 206 within that locked region, and then unlocks the region. Scanner 138 also updates metadata in pointer blocks to indicate which file data blocks 206 have been zeroed, as described with reference to FIG. 3, below. In this way, scanner 138 can efficiently zero a number of storage blocks 206 of a storage device 140 while computing system 100 performs its routine tasks, and the zeroing likely occurs without disrupting I/O operations to storage system 104, keeping I/O latency low.

Figure 3:
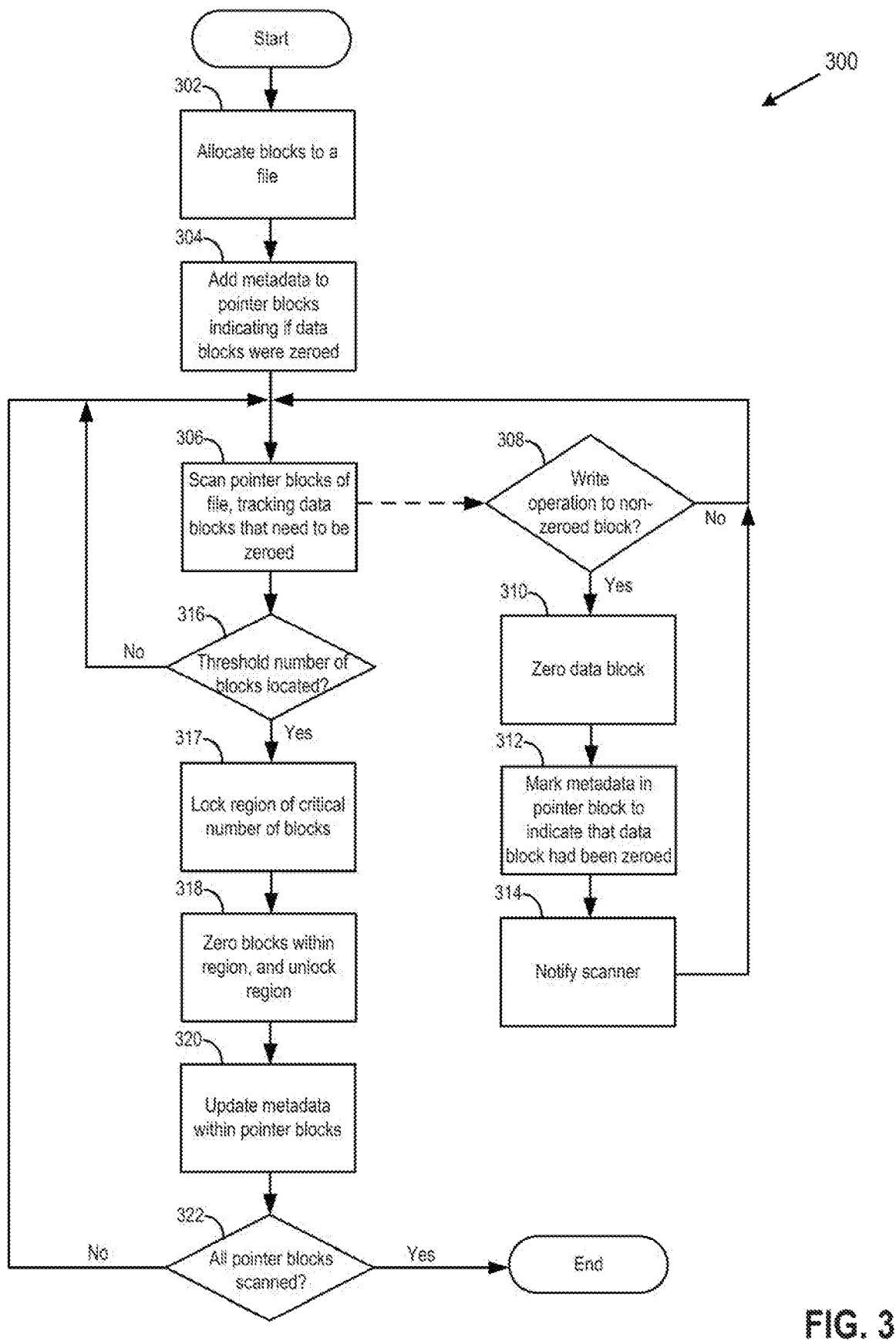
FIG. 3 depicts a flow diagram of a method of zeroing allocated data blocks of storage device, according to an embodiment.

FIG. 3 depicts a flow diagram of a method 300 of zeroing allocated data blocks of storage device 140, according to an embodiment. At step 302, a virtual disk file 136 is created and storage blocks of storage device 140 are allocated to the file. Virtual disk file 136 may be created by, for example, guest OS 142 sending a call to virtual disk 122, with the call being converted by storage layer 148 into a call to VMFS driver 128, which then sends a call to storage system 104. The storage blocks 202/204/206 may be allocated to virtual disk file 136 by storage system 104. As part of creation of the file, storage system 104 may zero all file descriptor block(s) 202 and all pointer blocks 204 of virtual disk file 136 prior to writing metadata into the allocated file descriptor block 202 and pointer blocks 204.

At step 304, storage system 104 adds metadata to all pointer blocks 204 of virtual disk file 136, the metadata data indicating that the blocks have been allocated and that the blocks have not been zeroed. As discussed, such metadata can be represented by two rows, each entry in the first row indicating whether a downstream file data block 206 has been zeroed, and each entry in the second row indicating whether a downstream file data block 206 has been allocated. An entry of "1" in the first row may indicate that a downstream block 206 has not been zeroed, while an entry of "0" may indicated that a downstream block 206 has been zeroed. An entry of "1" in the second row may indicate that a downstream block 206 has been allocated, while an entry of "0" may indicate that a downstream block 206 has not been allocated. At the completion of step 304, all pointer blocks 204 of virtual disk file 136 include two rows of metadata, with each row consisting entirely of 1's, which indicates that all downstream blocks have been allocated and have not yet been zeroed.

At step 306, scanner 138 begins to scan pointer blocks 204 of virtual disk file 136, keeping track of which allocated file data blocks 206 have not yet been zeroed. While scanner 138 is scanning at step 306 or performing subsequent steps 316-322, guest OS 142 might send an I/O operation to virtual disk file 136, as indicated by step 308. Although step 308 is shown as continuing from step 306, step 308 may be reached from any of steps 306 to 322, inclusive.

At step 308, storage system 104 determines whether an I/O operation, such as a write operation, has been received, and whether that I/O operation is directed to at least one non-zeroed file data block 206. If not, then method 300 continues within steps 306 to 322 without performing steps 310-314. If so, the method 300 continues to step 310.

At step 310, storage system 104 determines which allocated and unzeroed block(s) 206 is the target of the I/O operation, and zeroes that one or more file data block 206. The zeroing at step 310 occurs synchronously with the incoming write operation. That is, the zeroing of step 310 occurs before the I/O operation received at block 308 executes. It should be noted that steps 308 through 314 of handling the write I/O operation may be performed in parallel and asynchronously to steps 306 through 322 of scanning and zeroing file data blocks 206.

At step 312, storage system 104 updates metadata contained in the pointer block 204 that points to the file data block 206 that was zeroed in step 310. The metadata is updated to reflect that a file data block 206 downstream to the pointer block 204 has been zeroed. For example, a "1" in a first row of metadata in the position associated with the zeroed file data block 206 may be changed to a "0." It should be noted that zeroing file data blocks 206 and updating the associated metadata in pointer block 204 are operations occurring within VMFS 134, which is implemented throughout computer system 100. This means that the zeroing and metadata updates are visible to (e.g., propagated to) each host 105, such as to a cluster or a group of hosts 105.

At step 314, storage system 104 notifies scanner 138 that file data block 206 has been zeroed. If scanner has already scanned the file data block 206 zeroed at step 310, then scanner 138 may have outdated information (indicating unzeroed status) regarding the zeroed status of the file data block 206 zeroed at step 310. As part of step 312 or 314 or afterwards, storage system executes the I/O operation received at step 308.

At step 316, scanner 138 determines whether a threshold number of unzeroed file data blocks 206 blocks have been identified. The threshold may be configurable. The threshold number of file data blocks may be defined in varying ways. The threshold number of blocks may be defined as a percentage of unzeroed storage blocks 206 within a set (e.g., contiguous linear region) of storage blocks. The percentage may be, for example, 40%, 60, 80%, 90%, or 95%. The size of the set of storage blocks may be, for example, 512 MB up to 8 GB. For example, if 80% of a 1 GB set of storage blocks 206 is composed of unzeroed blocks 206, then the conditional of step 316 may be met and method 300 proceeds to step 317. Another way the threshold may be defined is with respect to percentage of addresses in a pointer block page (not shown). A page of pointer blocks 204 can hold, for example, up to 512 MB. If, for example, 20% of the blocks in a pointer block page are unzeroed, then the conditional of step 316 may be met and method 300 proceeds to step 317. If the conditional of step 316 is not met, then method 300 returns to step 306 to scan more metadata of pointer blocks 204 of virtual disk file 136.

It should be noted that if scanner 138 determines at block 316 that a threshold number of blocks 206 have not been located, but there are, for example, no more storage blocks within virtual disk file 136 to scan, then method 300 may end rather than return to step 306, or method 300 may proceed to step 317 despite the threshold number of blocks not having been located.

At step 317, scanner 138 locks the set of storage blocks containing a threshold number of blocks 206, as determined at step 316. The locking prevents any write operations from being executed within this set while scanner 138 is zeroing file data blocks 206 of the locked set.

At step 318, scanner 138 zeroes file data blocks 206 that have not been previously zeroed, within the locked set. Whether a file data block 206 of the locked set has been previously zeroed may be determined by referencing metadata of pointer blocks 204. In an embodiment, the zeroing may be accomplished by sending the SCSI UNMAP command to storage system 104, by scanner 138, indicating which file data block 206 to unmap.

As part of step 318, after the zeroing has completed, scanner 138 unlocks the set of storage blocks 206. In an embodiment, the locked set may contain storage blocks other than file data blocks 206 of virtual disk file 136.

At step 320, scanner 138 updates metadata of pointer blocks 204 so that the metadata indicates that blocks 206 zeroed at step 318 have now been zeroed.

At step 322, scanner 138 determines whether all pointer blocks 204 of virtual disk file 136 have been scanned. If so, then method 300 ends. If not, then method 300 returns to step 306 to scan more pointer blocks 204 of virtual disk file 136.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of zeroing data blocks of a storage device, the method comprising:
    allocating a plurality of data blocks of the storage device to a file, wherein the plurality of data blocks comprises one or more file descriptor blocks, one or more pointer blocks, and one or more file data blocks, wherein the one or more file descriptor blocks points to at least some of the one or more pointer blocks, and wherein the one or more pointer blocks point to at least some of the one or more file data blocks;
    scanning, by a scanner, the one or more pointer blocks of the file for metadata indicating whether the one or more file data blocks are unzeroed file data blocks;
    determining whether a threshold number of unzeroed file data blocks are located within a set of data blocks of the storage device;
    when it is determined the threshold number of unzeroed file data blocks are located within the set of data blocks:

locking the set of data blocks to prevent write operations to the set of data blocks;
zeroing first file data blocks that are unzeroed within the set of data blocks; and
unlocking the set of data blocks.

2. The method of claim 1, the method further comprising, when it is determined the threshold number of unzeroed file data blocks are located within the set of data blocks, updating the metadata of the one or more pointer blocks to indicate that the first file data blocks have been zeroed.

3. The method of claim 2, wherein the storage device is connected to a plurality of host computers, and wherein the updated metadata of the one or more pointer blocks is visible to each host computer of the plurality of host computers.

4. The method of claim 1, the method further comprising:
receiving an input/output (I/O) operation to a second file data block of the file that is unzeroed;
zeroing the second file data block;
notifying the scanner that the second file data block has been zeroed; and
performing the I/O operation on the zeroed second file data block.

5. The method of claim 4, wherein the first file data blocks comprise the second file data block, and wherein the zeroing the first file data blocks comprises skipping zeroing of the second file data block.

6. The method of claim 1, wherein the file is part of a virtual disk file located on the storage device, wherein the virtual disk file is associated with a virtual disk implemented on a virtual machine of a host computer.

7. The method of claim 1, wherein the zeroing at least in part by a Small Computer System Interface (SCSI) UNMAP command.

8. The method of claim 1, wherein the set of data blocks corresponds to a contiguous linear region of the storage device.

9. A non-transitory computer readable medium comprising instructions to be executed in a processor of a computer system, the instructions when executed in the processor cause the computer system to carry out a method of zeroing data blocks of a storage device, the method comprising:
allocating a plurality of data blocks of the storage device to a file, wherein the plurality of data blocks comprises one or more file descriptor blocks, one or more pointer blocks, and one or more file data blocks, wherein the one or more file descriptor blocks points to at least some of the one or more pointer blocks, and wherein the one or more pointer blocks point to at least some of the one or more file data blocks;
scanning, by a scanner, the one or more pointer blocks of the file for metadata indicating whether the one or more file data blocks are unzeroed file data blocks;
determining whether a threshold number of unzeroed file data blocks are located within a set of data blocks of the storage device;
when it is determined the threshold number of unzeroed file data blocks are located within the set of data blocks:
locking the set of data blocks to prevent write operations to the set of data blocks;
zeroing first file data blocks that are unzeroed within the set of data blocks; and
unlocking the set of data blocks.

10. The non-transitory computer readable medium of claim 9, the method further comprising, when it is determined the threshold number of unzeroed file data blocks are located within the set of data blocks, updating the metadata of the one or more pointer blocks to indicate that the first file data blocks have been zeroed.

11. The non-transitory computer readable medium of claim 10, wherein the storage device is connected to a plurality of host computers, and wherein the updated metadata of the one or more pointer blocks is visible to each host computer of the plurality of host computers.

12. The non-transitory computer readable medium of claim 9, the method further comprising:
receiving an input/output (I/O) operation to a second file data block of the file that is unzeroed;
zeroing the second file data block;
notifying the scanner that the second file data block has been zeroed; and
performing the I/O operation on the zeroed second file data block.

13. The non-transitory computer readable medium of claim 12, wherein the first file data blocks comprise the second file data block, and wherein the zeroing the first file data blocks comprises skipping zeroing of the second file data block.

14. The non-transitory computer readable medium of claim 9, wherein the file is part of a virtual disk file located on the storage device, wherein the virtual disk file is associated with a virtual disk implemented on a virtual machine of a host computer.

15. The non-transitory computer readable medium of claim 9, wherein the zeroing at least in part by a Small Computer System Interface (SCSI) UNMAP command.

16. The non-transitory computer readable medium of claim 9, wherein the set of data blocks corresponds to a contiguous linear region of the storage device.

17. A computer system comprising:
a storage device;
a scanner; and
a processor, wherein the processor is programmed to carry out a method of zeroing data blocks of the storage device, the method comprising:
allocating a plurality of data blocks of the storage device to a file, wherein the plurality of data blocks comprises one or more file descriptor blocks, one or more pointer blocks, and one or more file data blocks, wherein the one or more file descriptor blocks points to at least some of the one or more pointer blocks, and wherein the one or more pointer blocks point to at least some of the one or more file data blocks;
scanning, by a scanner, the one or more pointer blocks of the file for metadata indicating whether the one or more file data blocks are unzeroed file data blocks;
determining whether a threshold number of unzeroed file data blocks are located within a set of data blocks of the storage device;
when it is determined the threshold number of unzeroed file data blocks are located within the set of data blocks:
locking the set of data blocks to prevent write operations to the set of data blocks;
zeroing first file data blocks that are unzeroed within the set of data blocks; and
unlocking the set of data blocks.

18. The computer system of claim 17, the method further comprising, when it is determined the threshold number of unzeroed file data blocks are located within the set of data blocks, updating the metadata of the one or more pointer blocks to indicate that the first file data blocks have been zeroed.

19. The computer system of claim 17, wherein the storage device is connected to a plurality of host computers, and wherein the updated metadata of the one or more pointer blocks is visible to each host computer of the plurality of host computers.

20. The computer system of claim 17, the method further comprising:
- receiving an input/output (I/O) operation to a second file data block of the file that is unzeroed;
- zeroing the second file data block;
- notifying the scanner that the second file data block has been zeroed; and
- performing the I/O operation on the zeroed second file data block.

* * * * *